M. A. THIEL.
VALVE GEAR FOR GAS ENGINES.
APPLICATION FILED SEPT. 22, 1910.

1,070,558.

Patented Aug. 19, 1913.
4 SHEETS—SHEET 1.

M. A. THIEL.
VALVE GEAR FOR GAS ENGINES.
APPLICATION FILED SEPT. 22, 1910.

1,070,558.

Patented Aug. 19, 1913.
4 SHEETS—SHEET 4.

ly desirable to meet changes in the

UNITED STATES PATENT OFFICE.

MARTIN A. THIEL, OF MOUNT VERNON, OHIO, ASSIGNOR TO THE C. & G. COOPER CO., OF MOUNT VERNON, OHIO, A CORPORATION OF WEST VIRGINIA.

VALVE-GEAR FOR GAS-ENGINES.

1,070,553.  Specification of Letters Patent.  Patented Aug. 19, 1913.

Application filed September 22, 1910. Serial No. 583,299.

*To all whom it may concern:*

Be it known that I, MARTIN A. THIEL, of Mount Vernon, county of Knox, and State of Ohio, have invented certain new and useful Improvements in Valve-Gears for Gas-Engines, of which the following is a full, clear, and exact specification, such as will enable others skilled in the art to which it appertains to make and use the same.

The present application relates to modifications of the inlet valve forming part of the subject-matter of my co-pending application for patent on gas engine valve mechanism, Serial No. 583,298, filed September 22, 1910, wherein the inlet valve is combined with a governor controlled regulating valve.

According to the modifications forming the subject of this application, I combine with the inlet valve, two peculiarly constructed tubular regulating valves arranged one within the other, one of them moving with the inlet valve to open and close the air and gas ports or either of them and the other moving under the governor to control the amount of air and gas or either of them admitted.

My present invention also involves certain novel features of structure and arrangement concerning the housing or cage mounting these valves and the arrangement of elements adjacent thereto.

The invention also involves peculiar features of construction which allow for minute adjustment of the gas ports, whereby the maximum amount of gas admitted is permanently regulated, thus adapting the mechanism to gases of varying composition and adapting it particularly to natural and other very rich gases.

Various other features of importance are involved and all will be fully set forth hereinafter and particularly pointed out in the claims.

For this purpose reference is now had to the accompanying drawings which represent as examples the preferred embodiment of the invention.

Figure 1:
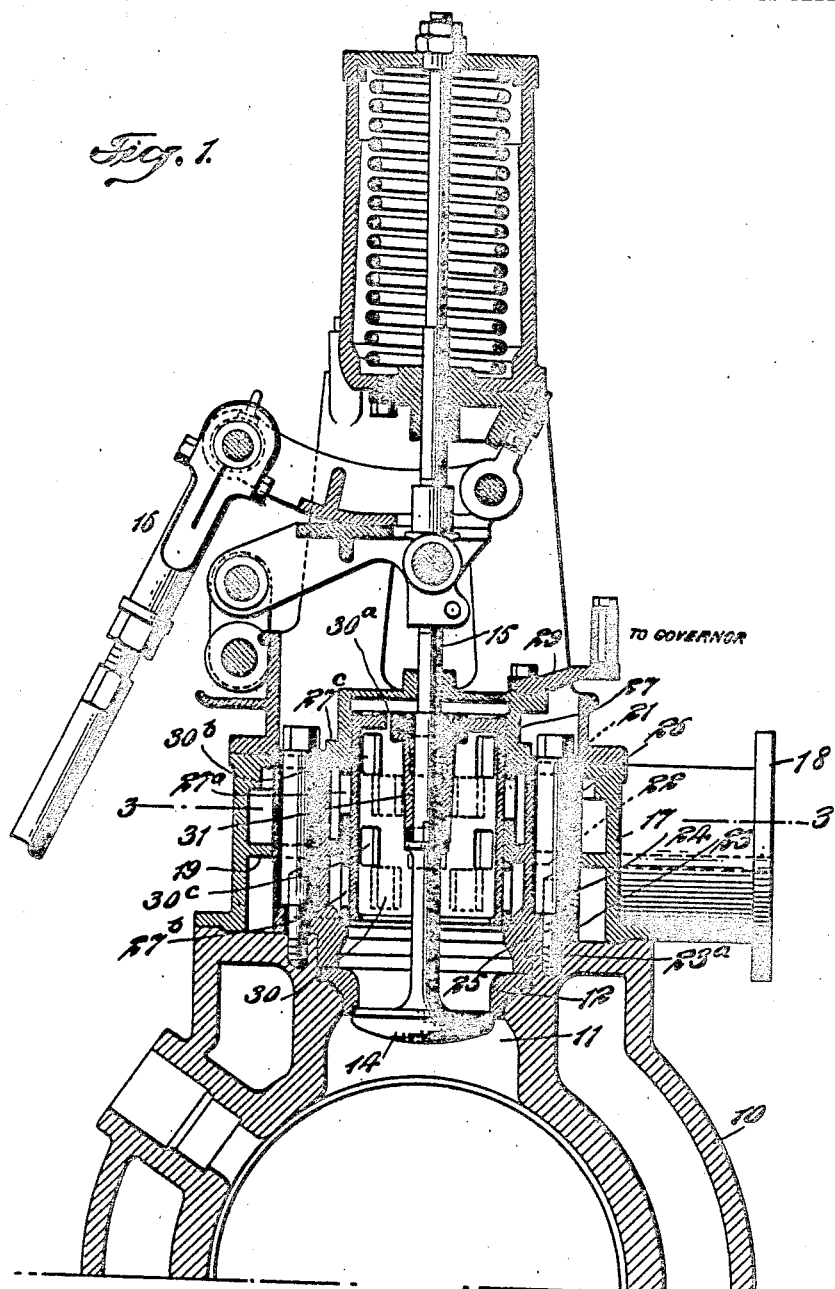
Figure 2:
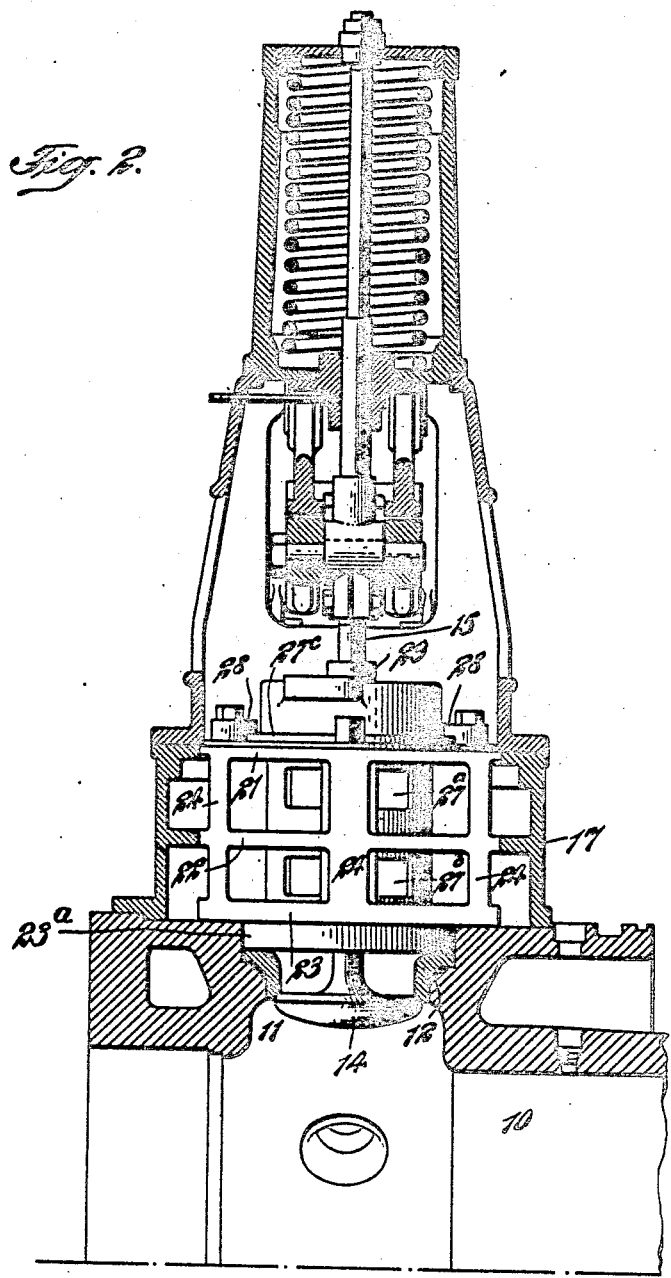
Figure 3:
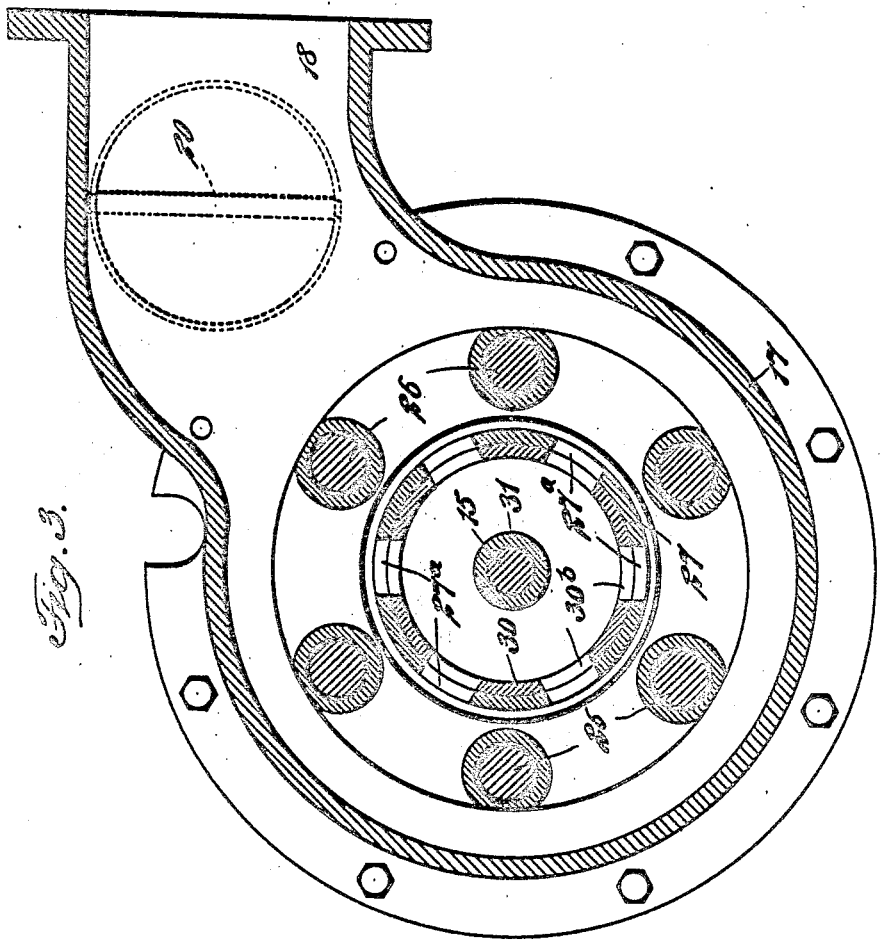
Figure 4:
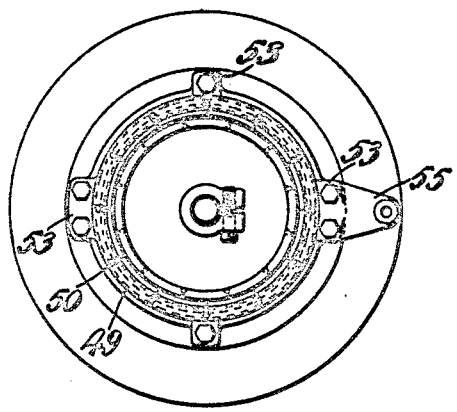
Figure 6:
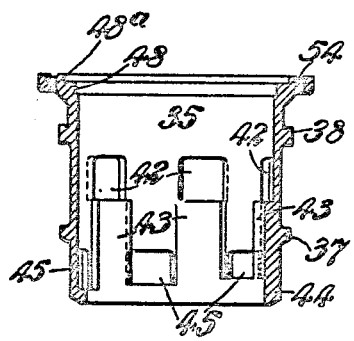
Figure 5:
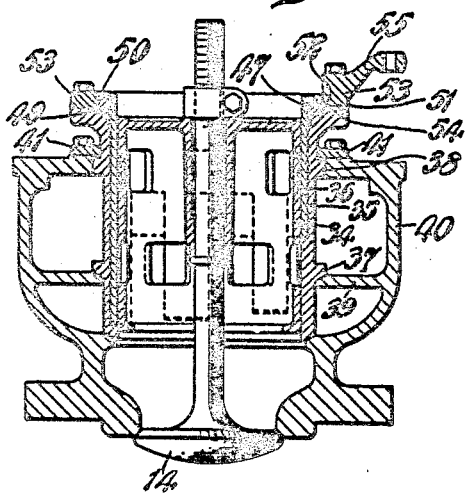
Figure 7:
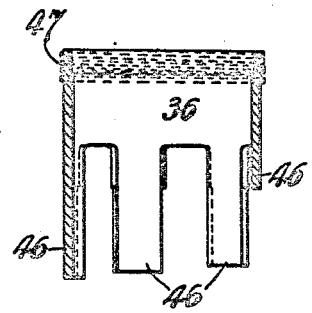

In these drawings—Figure 1 represents a vertical section of the invention taken transversely of the cylinder; Fig. 2 is a vertical section taken longitudinally of the cylinder; Fig. 3 is a horizontal section on the line 3—3 of Fig. 1; Fig. 4 is a plan view of the structure of Fig. 5, Fig. 5 is a vertical section of a further modification; Fig. 6 is a detail section of the regulating sleeve forming part of the structure of Fig. 5; Fig. 7 is a similar view of the gas adjusting sleeve also forming part of the structure of Fig. 5.

Referring first to Figs. 1-3, 10 indicates the cylinder of the engine, the top of which is faced off as shown and formed with an inlet port 11 carrying the seat 12 of the inlet valve 14. The stem 15 of the valve extends upward and is connected with a gear 16 for operating it, all of which is fully set forth and claimed in my co-pending application above referred to.

An annular valve chamber 17 is fastened on the faced surface of the cylinder and communicates with a tangentially disposed pipe 18 supplying the air and gas. The said valve chamber 17 is formed interiorly with a horizontal web or wall 19 which divides it into upper and lower chambers, the former for the air and the latter for the gas. The pipe 18 may be similarly partitioned and the gas side provided with a butterfly valve 20 (see broken lines in Fig. 3) for regulating the gas flow manually, as is frequently desirable to meet changes in the composition of the gas. The precise form of the pipe 18 is not material, however, the only requisite being that the gas and air be brought separated to the divisions of the valve chamber.

Within the chamber 17 is a valve bearing cage composed of three horizontal annular walls 21, 22 and 23, joined by a number of bolt sleeves 24 (here shown as six). This cage bears on the surface top of the cylinder, and its wall 23 engaging the same, while its wall 22 meets the wall or web 19 its wall 21 meets the top wall of the chamber 17. At its inner edge the wall 23 of the valve cage has an annular skirt or depending portion 23ᵃ which bears on the inlet seat 12 and holds the same in place. The cage is fastened in place by studs 25 which are screwed into the cylinder and project up into the bolt sleeves 24 and are there engaged by elongated nuts 26 which extend through the bolt sleeves to a point above the cage where they are accessible to permit the removal of the valve mechanism. The walls 21, 22 and 23, it may be perceived, preserve the separate air and gas chambers and in fact form parts of the same.

Within the valve cage is arranged the tubular regulating valve 27; this is open at its bottom and it is closed at its top to prevent escape of the explosive mixture. Said valve is rotatably seated on the walls 21, 22 and 23 of the cage and projects above the same as shown in Fig. 1. The valve is formed with ports 27ª and 27ᵇ respectively communicating with the air and gas chambers and it is prevented from upward motion by clips or lugs 28 which are bolted down on the wall 21 of the valve cage and have sliding engagement with a flange 27ᶜ on the upper portion of the valve.

29 indicates an arm fastened to the top of the valve 27 and adapted to be connected to the governor linkage so that, according to the position of the governor, the position of the valve around its vertical axis will be changed as will fully appear hereinafter.

Within the tubular regulating valve 27 is a mixing valve-sleeve 30. This has a hub 31 which is fastened to the stem 15 of the inlet valve 14 so that the valve 30 moves with the inlet valve and is incapable of rotating on the stem. The valve 30 is open at its bottom to the space, inclosed by the valve seat and its top is webbed to the hub 31, though open or orificed as at 30ª to prevent the formation of a partial vacuum in the top of the valve 27 due to the downward motion of the valve 30. The mixing valve 30 has two series of ports 30ᵇ and 30ᶜ respectively provided for the air and gas. Normally (when the inlet valve is closed) the ports 30ᵇ and 30ᶜ stand above the ports 27ª and 27ᵇ so that the air and gas are cut off by the valve 30, but when the inlet valve opens the mixing valve moves down, bringing the ports 30ᵇ and 30ᶜ into registry respectively with the ports 27ª and 27ᵇ and allowing the gas and air to mix and enter the cylinder.

In operation of the valve mechanism, the air and gas lie in the valve chamber and cage divided or kept separate by the walls or webs 19 and 22 and confined or stopped off by the mixing valve 30. When the valve gear opens the inlet valve, the mixing valve 30 moves down and brings the ports 30ᵇ and 30ᶜ into registry with the ports 27ª and 27ᵇ allowing the air and gas to flow into the mixing valve and from it through the inlet port to the cylinder. In this movement the air and gas are mixed to form the explosive charge. Simultaneously the governor is acting on the regulating valve 27 and this valve is in a constant state of oscillation whereby the degree or extent of registry of the ports 27ª and 27ᵇ and the ports 30ᵇ and 30ᶜ is varied. This varies the effective area of the air and gas openings into the cylinder and therefore the amount of the charge admitted. It will be seen that the air and gas are uniformly throttled, thus bringing about a change in the quantity of the charge, but avoiding a change in the quality or proportions of the explosive mixture. By thus increasing or diminishing the amount of the charge, regulation of the engine is effected.

Figs 4 to 7 show a form of the valve which is adapted especially for natural gas, wherein the gas ports are comparatively narrow and susceptible to very fine adjustment. In this way the valve may be set and locked to suit the particular character of the gas being used. According to this form of the invention, the inner or mixing valve sleeve 34 is essentially the same as before described and is carried to reciprocate with the inlet valve as is shown in the drawings (Fig. 5). The outer or regulating valve sleeve, however, is of composite structure, comprising a main body or portion 35, an inner or adjustment member 36 and various appurtenant parts which will presently be described. The main part 35 of the regulating sleeve has external annular ribs 37 and 38, the lower of which, 37, bears on a wall 39 in the housing 40 and the upper of which meets the top wall of the housing and is engaged by lugs 41, whereby the sleeve is held rotatably, but prevented from axial motion. The said wall 39 forms two chambers in the housing, the upper for the air and the lower for the gas. The body 35 has air ports 42 in a horizontal line around its circumference and below each of these ports 42 are vertically disposed internal ribs 43 of gradually decreasing length. These ribs extend downward and are merged into a thickened lower portion 44 which brings the lower edge of the body to a thickness equal that of the ribs and the upper part of the body. The ribs 43 therefore form vertical internal grooves running downward from the ports 42 for gradually increasing or gradually decreasing distances and at the lower ends of these grooves are formed the gas ports 45 which are all of equal width but gradually decrease in vertical extent correspondingly with the gradual increase in the length of the ribs 43. The inner or adjustment member 36 has an unbroken portion fitting snugly within the body 35 and below this it is formed with parallel downwardly projecting lugs 46, which fit in the spaces between the ribs 43 on the body 35. The lugs 46 are of the same increasing length as the ribs and their lower ends lap the gas ports 45 closing them to an extent dependent upon the vertical position of the member 36 compared to the body 35. The lugs 46 are longer than the ribs so that the spaces between the lugs at their upper portions register with and leave uncovered the air ports 42. As shown in Fig. 5, when the parts 35 and 36 are fitted together characteristically they constitute a uniform thickness with a smooth inner surface snugly yet movably engaging the outer walls of the mixing sleeve 34. The upper end of the adjustment member 36 is externally threaded as shown at 47 and the body 35 is formed at its upper end with a double interior rabbet 48 and 48ª, the former to accommodate the threads 47 and the latter to accommodate an interiorly threaded annulus 49 which engages and coacts with the threads 47. The adjustment member 36, it will be noted, cannot rotate in the body 35, but it is free to move vertically. Hence by rotating the annulus 49 the said member 36 may be moved up or down and the effective area of the gas ports 45 varied as described. The annulus 49 has spanner holes 50 or may be furnished with other means facilitating its rotation. In the outer surface of the annulus 49 is an annular groove 51 and into this groove project arc-shaped tongues 52 on clips 53 which are batted down on the body 35 and formed on their under surfaces with arc-shaped ribs 54 which fit in corresponding grooves in the top of the body 35. By tightening the bolts of said clips 53 the annulus 49 is clamped against rotation and, the adjustment member being incapable of rotation, it is therefore held at the desired adjustment. By slackening the bolts, the annulus may be rotated to adjust the member 36. One of the clips 53 has an arm or extension 55 adapted to be articulated to the governor for the purpose and in the manner before described. The operation of this form of valve is the same as that of the forms before described, excepting that since the gas ports in the regulating valve stand at different elevations they are successively opened by the movement of the mixing valve. This introduces the gas into the body of air in a number of closely following streams and facilitates the mixing operation. The regulating valve rotates back and forth during operation according to the governor position, thereby increasing or diminishing the air and gas and regulating by varying the amount of mixture rather than its quality.

Having thus described my invention what I claim as new and desire to secure by Letters Patent of the United States is:

1. A gas engine valve mechanism comprising the combination of inlet valve, an air supply passage, a gas supply passage, two hollow concentric valves concentric with the inlet valve between said passages and said inlet valve, and having separate sets of registering ports for each passage and means for moving one of said hollow valves to open both sets of ports, the other of said hollow valves being rotatable to vary the effective area of said ports and to vary the volume of the mixture without varying its percentage composition.

2. A gas engine valve mechanism comprising the combination of the inlet valve, hollow regulating and mixing valves, provided with air and gas ports one inclosing the other and both open to the inlet port at their inner ends and one being closed at its outer end, means connecting the regulating valve with the governor, means synchronously operating the inlet and mixing valves, means inclosing the valves and forming air and gas chambers, and means for manually adjusting the effective area of the gas ports in the regulating valve.

3. A gas engine valve mechanism comprising the combination of the inlet valve, hollow regulating and mixing valves, one inclosing the other and both open to the inlet port at their inner ends and one being closed at its outer end, means connecting the regulating valve with the governor, means synchronously operating the inlet and mixing valves, means inclosing the valves and forming air and gas chambers, and means for manually adjusting the gas flow through the regulating valve.

4. A gas engine valve mechanism comprising the combination of the inlet valve, hollow regulating and mixing valves, provided with air and gas ports, one inclosing the other and both open to the inlet port at their inner ends and one being closed at its outer end, means connecting the regulating valve with the governor, means synchronously operating the inlet and mixing valves, means inclosing the valves and forming air and gas chambers, such means exposing the said outer end of the outer hollow valve, and means for manually adjusting the effective area of the gas ports in the regulating valve.

5. A gas engine valve mechanism comprising the combination of the inlet valve, hollow regulating and mixing valves, one inclosing the other and both open to the inlet port at their inner ends and one being closed at its outer end, means connecting the regulating valve with the governor, means synchronously operating the inlet and mixing valves, means inclosing the valves and forming air and gas chambers, such means exposing the said outer end of the outer hollow valve, and means for manually adjusting the gas flow through the regulating valve.

6. In a gas engine valve mechanism, the combination of an inlet valve, hollow mixing and regulating valves provided with air and gas ports, the regulating valve being rotatable, means for manually adjusting the effective area of the gas ports in the regulating valve, means for automatically operating the regulating valve in accordance with the load on the engine and means for synchronously operating the inlet and mixing valves.

7. In a gas engine valve mechanism, the combination of an inlet valve, a mixing valve connected to move therewith, a hollow rotary regulating valve provided with air and gas ports inclosing the mixing valve, means for manually adjusting the effective areas of the gas ports in the regulating valve and means for automatically operating the regulating valve in accordance with the load on the engine.

8. In a gas engine valve mechanism, the combination of an inlet valve, hollow mixing and regulating valves, said regulating valve being rotatable, means for manually adjusting the gas flow through the regulating valve, means for automatically operating the regulating valve in accordance with the load on the engine, and means for synchronously operating the inlet and mixing valves.

9. In a gas engine valve mechanism, the combination of an inlet valve, a mixing valve connected to move therewith, a hollow regulating valve inclosing the mixing valve, means for manually adjusting the gas flow through the regulating valve and means for automatically operating the regulating valve in accordance with the load on the engine.

10. A gas engine valve mechanism comprising the combination of the inlet valve, a hollow regulating valve provided with air and gas ports open at its inner end to the inlet port, means forming air and gas chambers surrounding the regulating valve, a mixing valve within the regulating valve and operating synchronously with the inlet valve, and means for manually adjusting the effective area of the gas ports in the regulating valve.

11. A gas engine valve mechanism comprising the combination of the inlet valve, a hollow regulating valve open at its inner end to the inlet port, means forming air and gas chambers surrounding the regulating valve, a mixing valve within the regulating valve and operating synchronously with the inlet valve, and means for manually adjusting the gas flow through the regulating valve.

12. In a gas engine valve mechanism, the combination of an inlet valve provided with ports, a rotary regulating valve for air and gas, means for manually regulating the gas flow through the ports of said valve, and means for operating the regulating valve from the governor.

13. In a gas engine valve mechanism, the combination of an inlet valve for air and gas, a single rotary regulating valve for the same provided with ports, means for manually adjusting the gas flow through the ports of said regulating valve, means for operating the regulating valve from the governor, and a mixing valve co-acting with the regulating valve.

14. In a gas engine valve mechanism, the combination of an inlet valve, a regulating valve having gas ports, means for manually varying the area of said gas ports, means for operating the regulating valve from the governor, and a mixing valve coacting with the regulating valve.

15. In a gas engine valve mechanism, the combination of an inlet valve, a regulating valve having gas ports, an adjustment member slidable on the regulating valve to vary the gas ports, means for fastening the adjustment member, means for operating the regulating valve from the governor and a mixing valve coacting with the regulating valve.

16. In a gas engine valve mechanism, the combination of an inlet valve, a regulating valve having gas ports, an adjustment member slidable on the regulating valve to vary the gas ports, means for fastening the adjustment member, means for operating the regulating valve from the governor and a mixing valve coacting with the regulating valve, said regulating and mixing valves being hollow and the former inclosing the latter.

17. In a gas engine mechanism, the combination of an inlet valve, a regulating valve having gas ports, an adjustment member slidable on the regulating valve to vary the gas ports, means for fastening the adjustment member, means for operating the regulating valve from the governor and a mixing valve coacting with the regulating valve, said means for fastening the adjustment member comprising a ring threaded on the adjustment member.

18. In a gas engine valve mechanism, the combination of hollow mixing and regulating valves, the latter inclosing the former and rotating under the governor and both provided with ports, means for manually adjusting the amount of registration of said ports whereby the flow of air and gas to the engine may be regulated, and an inlet valve reciprocating synchronously with the regulating valve.

19. In a gas engine mechanism, the combination of hollow mixing and regulating valves, the latter inclosing the former and rotating under the governor, an inlet valve reciprocating synchronously with the mixing valve and means for manually adjusting the regulating valve, comprising an adjustment member slidable on the regulating valve and having lugs or fingers lapping ports thereof and devices for locking the adjustment member.

20. A gas engine valve mechanism comprising the combination of an inlet valve, an air supply passage, a gas supply passage, two hollow concentric valves, one of which is closed at the top and both of which are open at the bottom so as to permit gas and air to flow through the bottom to said inlet valve, said concentric valve having separate sets of registering ports for each passage and means for moving one of said valves to open both sets of ports, the other of said hollow valves being rotatable to vary the effective area of said ports and to vary the volume of the mixture without varying its percentage composition.

In testimony whereof I have signed my name to this specification in the presence of two subscribing witnesses.

MARTIN A. THIEL.

Witnesses:
FRED H. THOMAS,
M. B. SMALLEY.

Copies of this patent may be obtained for five cents each, by addressing the "Commissioner of Patents, Washington, D. C."